United States Patent [19]

Beauchemin et al.

[11] Patent Number: 5,006,225

[45] Date of Patent: Apr. 9, 1991

[54] METHOD AND APPARATUS FOR DETECTING HUMIDITY IN CUT LUMBER

[75] Inventors: Gratien Beauchemin, Sillery; André Gadoury, Ste-Foy; Claude Gravel, Beaupré , all of Canada

[73] Assignee: Centre de Recherche Industrielle du Quebec, Quebec, Canada

[21] Appl. No.: 371,810

[22] Filed: Jun. 27, 1989

[30] Foreign Application Priority Data

Jun. 29, 1988 [CA] Canada .................................. 570709

[51] Int. Cl.⁵ ......................... B07C 5/34; G01N 9/02; G01N 9/36

[52] U.S. Cl. ......................................... 209/3.3; 73/73; 73/433; 209/518; 209/521; 209/556; 209/592

[58] Field of Search .................................. 209/3.1-3.3, 209/517, 518, 520, 521, 555, 556, 558, 592-595, 917, 933, 934; 73/73, 433; 364/474.09, 506

[56] References Cited

U.S. PATENT DOCUMENTS

| | | | |
|---|---|---|---|
| 2,759,603 | 8/1956 | Bradley | 209/594 |
| 3,221,152 | 11/1965 | Jones | 73/433 X |
| 3,436,968 | 4/1969 | Unger et al. | 73/433 |
| 3,717,249 | 2/1973 | Faley | 209/555 X |
| 3,812,964 | 5/1974 | Woodruff | 209/555 |
| 3,812,965 | 5/1974 | Kurata et al. | 209/518 |
| 4,069,851 | 1/1978 | Bibler | 209/517 X |

FOREIGN PATENT DOCUMENTS

| | | | |
|---|---|---|---|
| 1033335 | 6/1978 | Canada | 209/518 |
| 52-33560 | 3/1977 | Japan | 209/518 |
| 0401342 | 2/1974 | U.S.S.R. | 209/593 |
| 0442856 | 7/1975 | U.S.S.R. | 209/592 |
| 1134908 | 1/1985 | U.S.S.R. | 73/73 |
| 1380808 | 3/1988 | U.S.S.R. | 209/517 |

*Primary Examiner*—Michael S. Huppert
*Assistant Examiner*—Edward M. Wacyra
*Attorney, Agent, or Firm*—Oblon, Spivak, McClelland, Maier & Neustadt

[57] ABSTRACT

A method and an apparatus for automatically detecting the approximate percentage of humidity in predetermined types of lumber cut to specific lengths. A conveyor is provided for conveying individual pieces of cut lumber to a weighing station which consists of platforms on which individual pieces of lumber are conveyed. One or more weighing cells are associated with the platforms for detecting the weight of the piece of lumber thereon. A control circuit is connected to the weighing cell and also to sensors which detect a predetermined length of the lumber pieces and the cross-sectional dimension thereof, and receives information signals therefrom to identify and classify the individual lumber pieces in accordance with one or more reference signals related to selected humidity content weight(s) of the lumber pieces. The apparatus compares the apparent density with selectable density(ies) used as criterium for sorting.

15 Claims, 6 Drawing Sheets

METHOD AND APPARATUS FOR DETECTING HUMIDITY IN CUT LUMBER

BACKGROUND OF THE INVENTION

1. Field of Invention

The present invention relates to a method and apparatus for automatically detecting the approximate percentage humidity in predetermined types of lumber cut to specific lengths by weighing the lumber and analyzing information signals representative of specific characteristics of a piece of lumber and comparing it with one or more reference signals.

2. Description of Prior Art

There are many governmental and other regulations that demand that lumber be dried before it is utilized in a structure. The humidity in wood varies extensively in accordance with the regions where the trees are grown, the sap in the wood (i.e., pine, spruce, cedar), the nature of the soil where the tree grows, the proximity of the roots of the tree in relation to the water table, etc. All these factors affect the percentage humidity in lumber and cause resulting problems when the lumber is dried. In order to sufficiently dry lumber pieces that are very humid, the drying time of lots of such lumber is relatively long. The disadvantage of such long periods of drying is that the cost for drying the lumber increases as well as the heat loss of the drier. Also, the availability of the drier diminishes. A further disadvantage is that in a lot of lumber there are usually lumber pieces which are substantially less humid than others and therefore these are over dried causing these lumber pieces to twist and/or split, particularly in the ends thereof. Accordingly, this wood becomes inferior in quality and must be removed from the lot and sold at an inferior price. Also, the lumber needs to be reclassified resulting in extra labor costs.

The density of lumber and its weight for a given volume varies in two ways. Firstly, the density of the lumber varies depending on the type of sap in the wood or the wood type, and the density also varies according to the humidity or the water content of the lumber. It is also known that the variations due to the sap density in lumber varies in the order of 25 to 35% of the base weight of the lumber, and that the variations in the weight caused by humidity (water content) could be in the range of 30 to 170%. Since there is more variation in weight caused by humidity, the present invention has concerned itself with determining the humidity in the wood as a criteria for classification of the lumber prior to the drying of same.

SUMMARY OF INVENTION

It is therefore a feature of the present invention to provide an apparatus for automatically detecting the approximate percentage humidity in predetermined types of cut lumber.

The apparatus of the present invention comprises conveyor means for conveying individual pieces of cut lumber to weighing means. Sensing means is associated with the conveyor for detecting the length and cross-sectional dimension of the individual pieces of cut lumber. Weighing means is also provided and comprises platform means for supporting individual ones of the pieces of cut lumber in movement thereover. One or more weighing cells are supporting to the platform means for detecting the weight of the piece of lumber thereon. Control circuit means is connected to the sensing means and weighing cells to receive information signals therefrom. Adjustable control means is provided for conditioning the circuit means to identify and classify the individual lumber pieces in accordance with one or more reference signals related to selected humidity content weight(s) of the lumber pieces.

According to another feature of the present invention there is provided a method for automatically detecting the approximate percentage humidity in predetermined types of cut lumber.

The method comprises conveying individual pieces of the cut lumber along a conveyor path and over weighing means associated with the conveyor path. The weight of the individual pieces is detected and an information signal is generated representative of its weight. The length of the individual pieces is also detected and an information signal is generated representative thereof. The cross-sectional dimension of the individual pieces is also detected and an information signal is generated representative thereof. The information signals are analyzed and a resulting signal value is produced for comparison with one or more reference signal values set by control means and determined by a chart which approximates the percentage humidity in specific lumber types by weight per cubic foot whereby to identify and classify individual lumber pieces in accordance with the reference signal values.

BRIEF DESCRIPTION OF DRAWINGS

A preferred embodiment of the present invention will now be described with reference to an example thereof illustrated in the accompanying drawings in which.

DESCRIPTION OF PREFERRED EMBODIMENTS

Figure 1A:
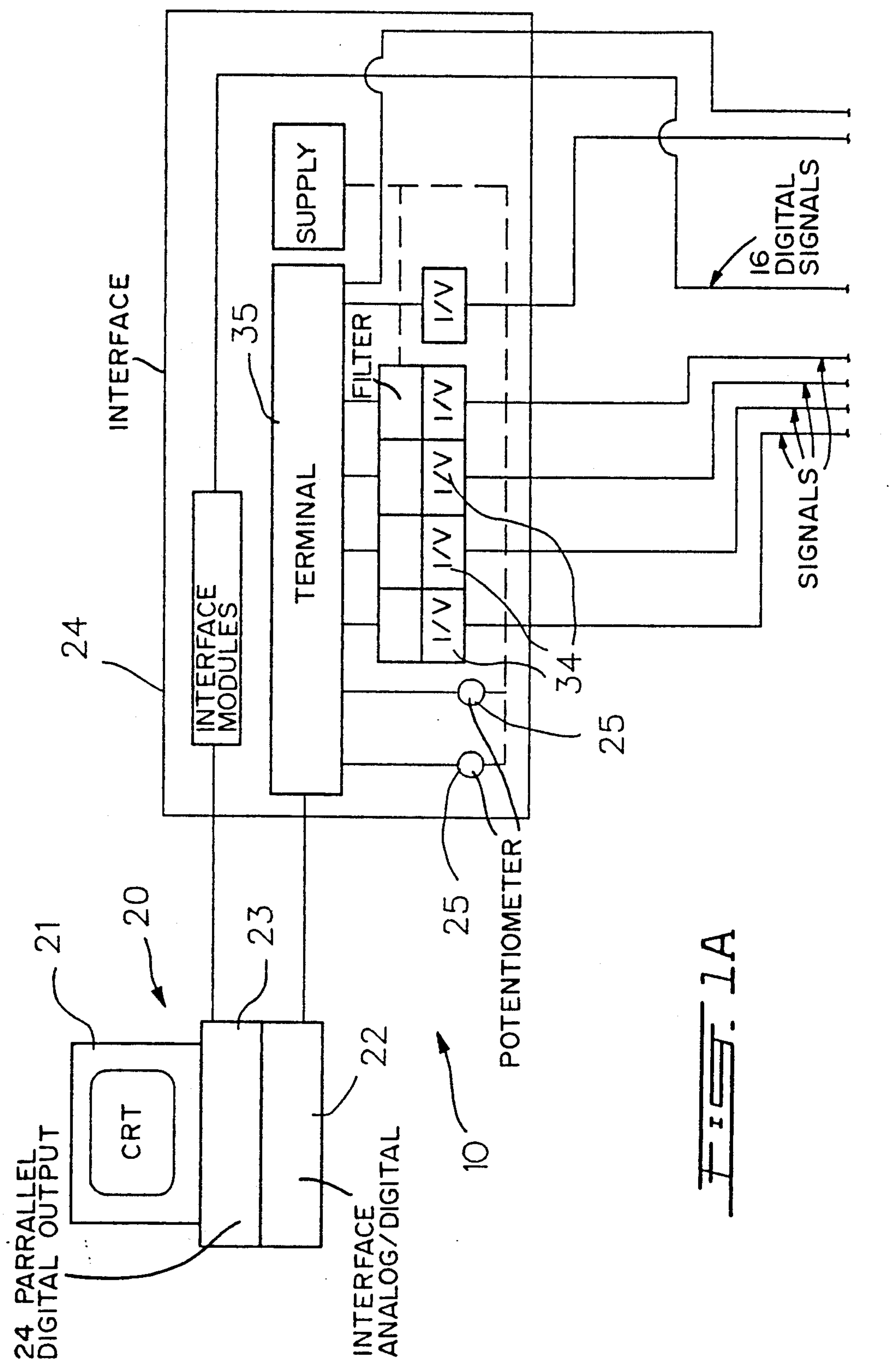
FIGS. 1A and 1B show a schematic diagram illustrating the method and apparatus of the present invention for automatically detecting the approximate percentage humidity in predetermined types of cut lumber.
Figure 1B:
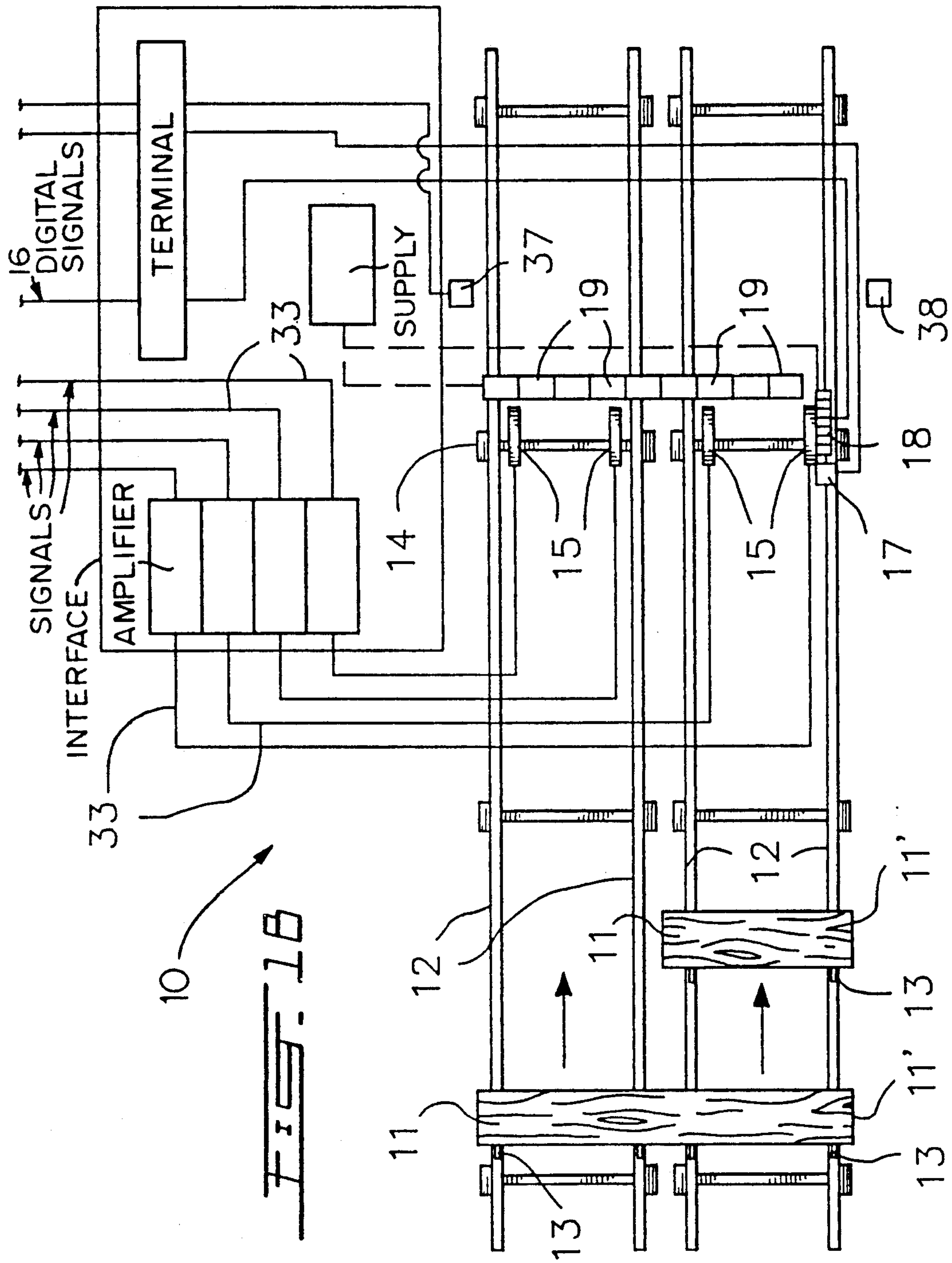

Referring now to the drawings, and more particularly to FIGS. 1A and 1B, there is shown generally at 10 the apparatus of the present invention for automatically detecting the approximate percentage humidity in predetermined types of cut lumber pieces 11. Conveyor means in the form of chain link conveyor belts having pusher elements 13 secured thereto are provided for conveying the lumber pieces 11 transversely and in a spaced apart manner along the conveyor chain or belt, and onto weighing means 15, as illustrated in FIGS. 3 and 4.

As shown in FIG. 1, weighing cells 15 are associated with the weighing means and detect the weight of individual pieces of lumber 11 which are placed on a weighing platform 16 (see FIG. 3), and generate information signals representative of the weight of the lumber pieces. A proximity detector 17 is provided upstream of the weighing means to detect the presence of an oncoming lumber piece and measure its thickness. Further, photocells 18 are provided along the conveyor path underneath the ends 11' of the lumber pieces whereby to detect the width of the lumber pieces. Further, sensing means in the form of limit switches 19 are also provided whereby to detect a predetermined length of the lumber piece 11, i.e., 4-feet, 8-feet, 12-feet, 16-feet, etc. All of these detectors generate information signals which are connected to a control means 20, as herein shown a computer having a screen 21 and an analog digital converter 22 and a digital input/output unit 23. An interface circuit 24 is connected between the various sensors and the control means and operates in any manner well known in the art. The control circuit will not be described in detail as it can be constructed in a variety of ways well known to a person skilled in the art.

Figure 5:
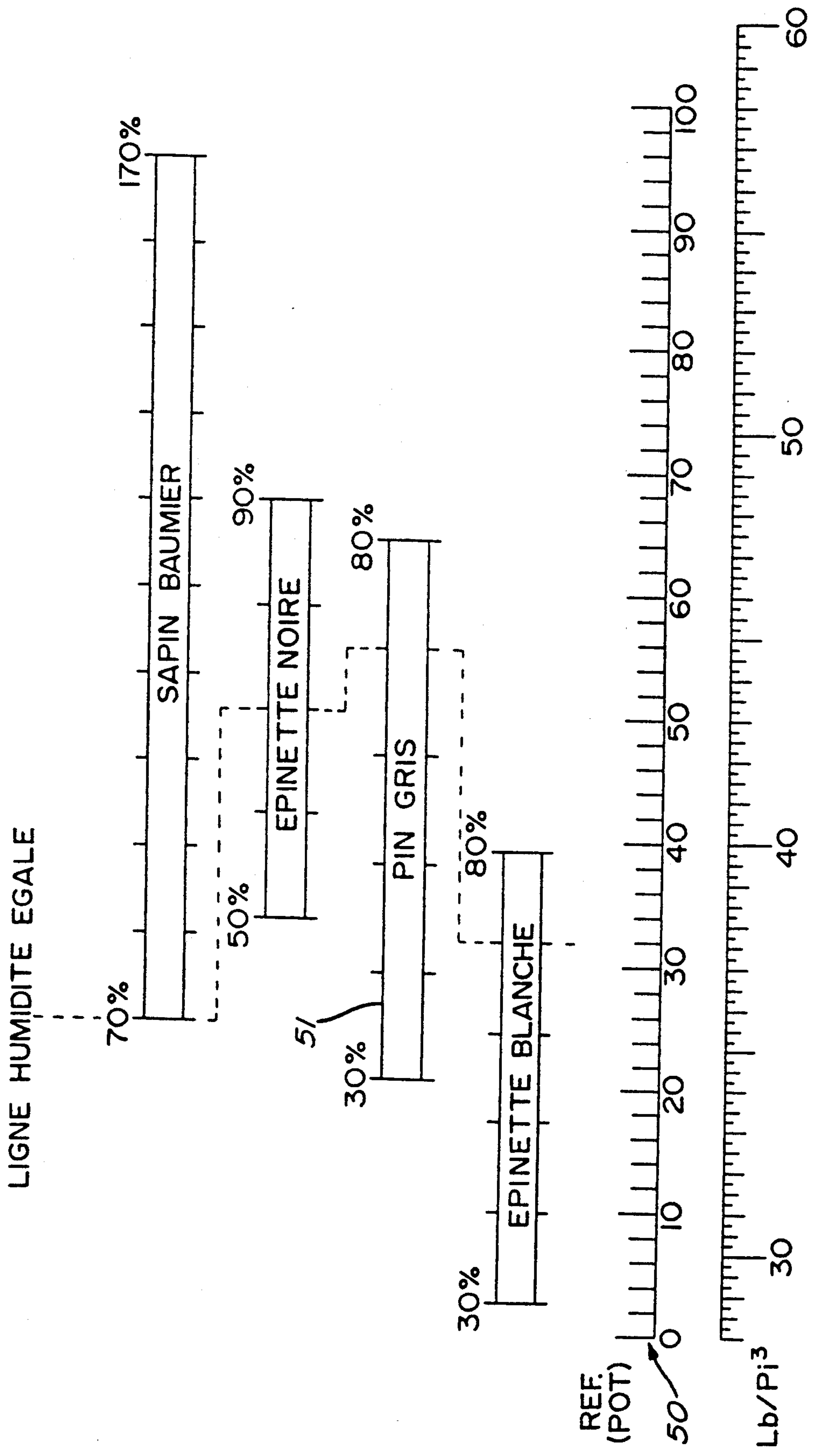
FIG. 5 is a chart illustrating the reference signal setting in relation to types of lumber and weight per cubic foot of such lumber dependent on the humidity content therein.

However, an important part of the control circuit is that it comprises one or more reference control devices, such as potentiometers 25, which are utilized to "set" one or more reference signals in the control circuit or computer 20. These reference signals are determined by a chart, as illustrated in FIG. 5, and which approximates the percentage humidity in specific lumber types by density (weight/volume). The signals from the weighing cells generate a signal corrected by the control circuit after analysis of the signals to produce a resulting signal indicative of the weight of the lumber piece. The resulting signal is compared with the reference signal to determine the classification of the lumber pieces being weighed in accordance with the value of the resulting signal. For example, if the lumber piece being analyzed is white spruce, then by referring to the chart of FIG. 5 it can be seen that the weight of spruce per cubic foot varies between a value of 28.7 $lb/ft^3$ for 30% humidity in the wood to 39.8 $lb/ft^3$ when there is 80% humidity content in such wood. Therefore, if one of the potentiometers is set at reference value 10, then any lumber weighing less than 31 pounds per cubic feet will be classified as containing less than 40% humidity. The second potentiometer could be set at value 17 thereby providing a reference signal which is representative of 50% humidity in the white spruce, thus enabling the control circuit to classify lumber in three categories and namely, lumber having less than 40% humidity, lumber having 40 to 50% humidity, and lumber having 50% or more humidity. It can be seen from the chart of FIG. 5 that for different lumber types the weight per cubic feet varies greatly, and by utilizing this chart it is possible to fairly accurately determine the amount of humidity in the lumber pieces being analyzed. However, it is important to know the type of lumber being analyzed by the apparatus so that the reference signals can be properly set at the desired classification values for humidity content.

Figure 3:
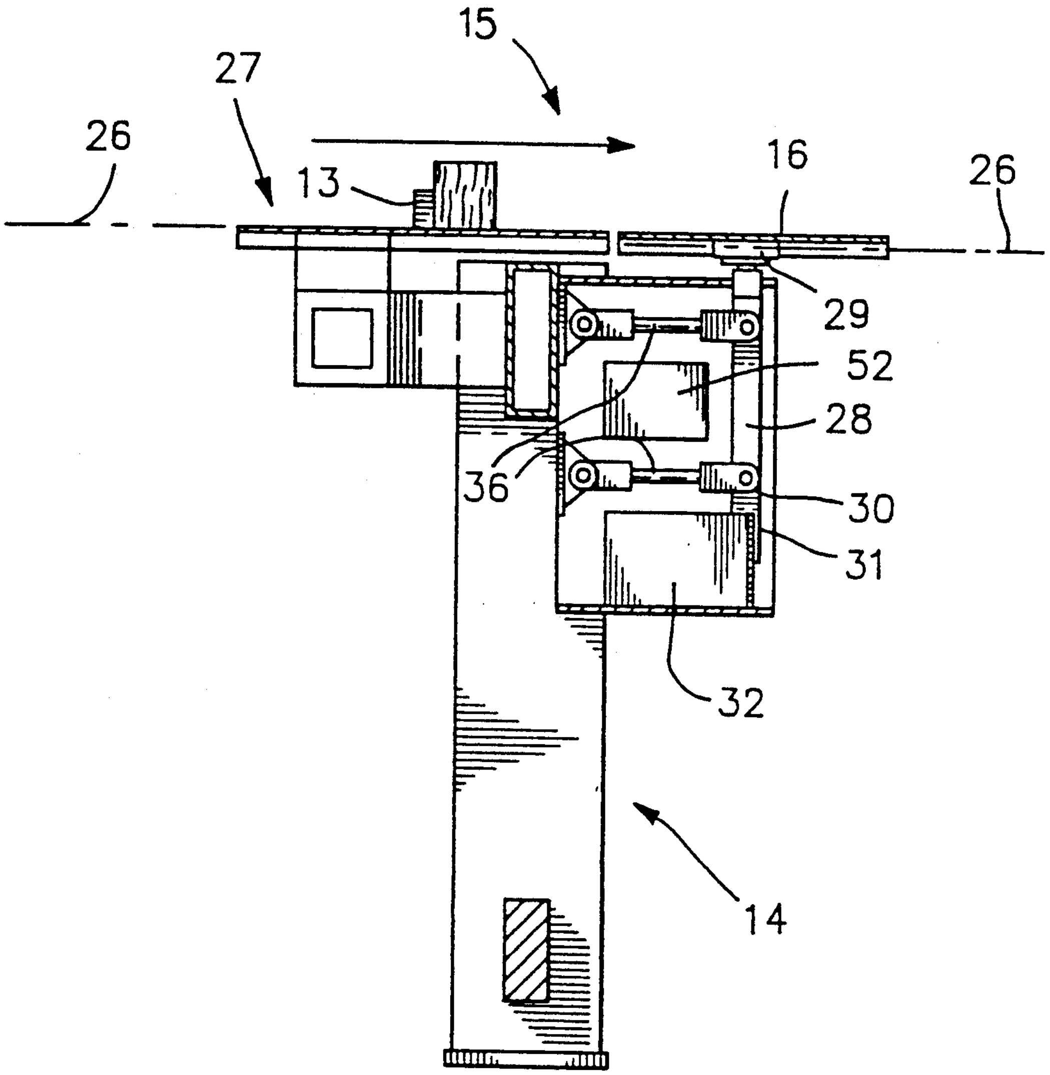
FIG. 3 is a side view of a weighing platform.
Figure 4:
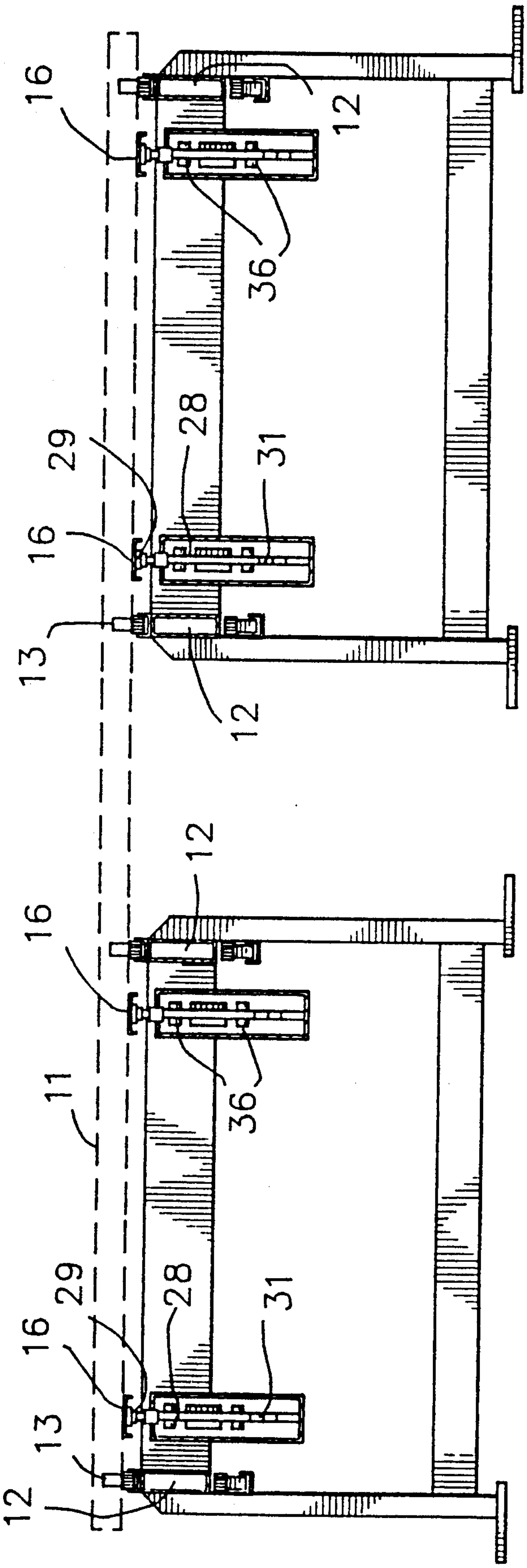
FIG. 4 is an end view illustrating the position of the weighing platforms along the conveyor of FIG. 2.

Referring now to FIGS. 3 and 4, there is illustrated the construction of the weighing means, and it consists of a plurality of weighing platforms 16 which are spaced apart transversely across the conveyor belts 12 and are disposed elevated from the support plane 26 of the conveyor. The lumber pieces are elevated onto the weighing platforms by a ramp element or shoe 27 which is angulated from the plane 26 thereby causing the lumber pieces to move up onto the platform 16.

As shown in FIG. 3 the weighing platform 16 is supported by a link arm 28 which is secured at a top end 29 to the underside of the platform 16 and supports same in a horizontal plane. A bottom end 30 of the link arm is connected to an attachment arm 31 which is connected to a strain cell 32 which includes a transducer 52 whereby to convert the load on the platform or the displacement of the link arm into an electrical signal representative of the load. The output signal of each transducer associated with each of the weighing platforms is connected to the interface unit 24 via individual connections 33 (see FIG. 1), and these signals are filtered at 34 and connected to a terminal connector 35 and to the control unit 20 via the interface 22. As shown in FIG. 3 the link arm 28 is secured to hinged guide lever arms 36 for supporting the link arm in a substantially vertical plane when there is no weight on the platform.

After the lumber pieces have been pushed out of the weighing platform 16 by the pusher elements 13 the stamper device 37 identifies the lot number on the piece of wood according to the previous piece.

It is also conceived that a paint or mark applicator device 38 may be provided adjacent one of the ends 11' of lumber pieces 11 and provide a paint spot or mark thereon indicative of the rating class of the lumber if the classification of the lumber is to be done visually by a person or a machine, or manually. It is also conceived that the conveyor 12 may be constructed by chain links or belts, but must have positive engagement with the drive shaft 39 in order to precisely follow lumber pieces for the classification of same.

Figure 2:
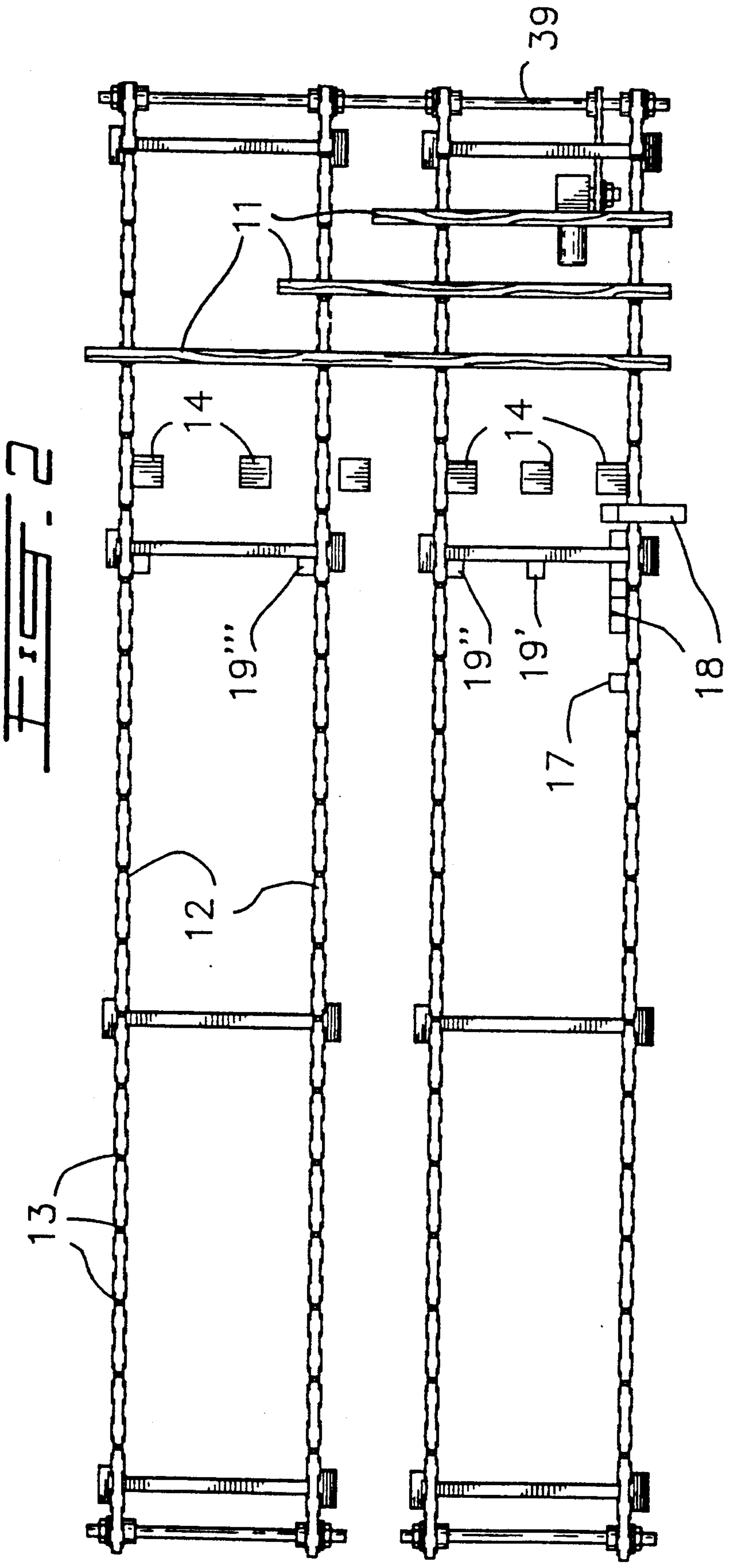
FIG. 2 is a top view of the conveyor means.

Summarizing the operation of the apparatus of the present invention to automatically approximate the percentage humidity in predetermined types of cut lumber, the lumber is firstly conveyed along a conveyor in individual pieces. This lumber is pre-cut lumber having specific lengths, but these lengths may vary on the conveyor. Therefore, limit switch detectors 19 are positioned at predetermined transverse intervals along the conveyor, as shown in FIG. 2, at positions 19' for 4-foot length lumber, 19''' for 12-foot lumber, etc. The cross-sectional dimension of the lumber piece is then determined by further photocell detectors 18 to determine the width. The height is determined by proximity sensor 17. Accordingly, we have now established the dimension or the cubic dimension of the lumber pieces. These lumber pieces are then conveyed over a weighing platform 16 where the lumber is weighed.

However, prior to the operation of the machine the type of lumber to be analyzed was predetermined, and by analyzing the chart of FIG. 5, the reference signals or reference potentiometer ratings, grid 50 in FIG. 5, was determined depending on the desired percentage humidity value rating of the lumber. If the lumber pieces being analyzed was jack pine as requested by the grid range 51, then for a reference signal representative of 30% humidity, one of the potentiometers 25 was set to a value of 20.5 which corresponds to a lumber weight of 34.2 $lb/ft^3$. Accordingly, lumber pieces generating a resulting signal of less than 34.2 $lb/ft^3$ is classified as having less than 30% humidity. Resulting signals above that value represents lumber pieces with more than 30% humidity. If it is necessary to classify the lumber in three groups of humidity values, then another reference potentiometer value is selected corresponding to another humidity value on the scale 51. Of course, more than two potentiometers 25 may be provided should there be a need to have more classified lumber groups.

It is within the ambit of the present invention to provide any obvious modifications of the invention provided such modifications fall within the scope of the appended claims. For example, after the weighing of the lumber pieces these pieces can be conveyed on a flat platform by an overhead conveyor, and the trap doors in the platform can be automatically actuated to redirect the specific lumber piece depending on its humidity content. It is also conceived that the chart of FIG. 5 could be programmed in the computer device 20 and the selection effected on the cathode ray tube screen by a cursor or keys. Therefore, the potentiometers 25 would not be required and the system would be fully automated. It is further conceived that the lumber pieces may be conveyed lengthwise and that the lumber may have any length which would be measured by sensors along the conveyor. Still further, the computer may be replaced by a micro processor circuit and there would be no need for a CRT.

We claim:

1. An apparatus for automatically detecting the approximate percentage humidity in predetermined types of cut lumber, said apparatus comprising conveyor mans for conveying individual pieces of cut lumber to weighing means, sensing means associated with said conveyor means for detecting the length and cross-sectional dimension of said individual pieces of cut lumber, said weighing means having platform means for supporting individual ones of said pieces of cut lumber in movement thereover, and one or more weighing cells are secured to said platform means for detecting the weight of said one piece of lumber, control circuit means connected to said sensing means and said one or more weighing cells to receive information signals therefrom, and adjustable control means for conditioning said circuit means to identify and classify said individual lumber pieces in accordance with one or more reference signals related to selected humidity content weight(s) of said lumber pieces.

2. An apparatus as claimed in claim 1 wherein said adjustable control means comprises one or more reference controls capable of establishing a reference signal rating in said control circuit means, said reference signal being determined by a chart which approximates the percentage humidity in specific lumber types by weight, said weighing cells generating signals which are corrected by said control circuit mans after analysis of said signals from said sensing means to produce a resulting signal for comparison with said reference signal to determine the classification of said lumber piece being weighed in accordance with said resulting signal value compared to said reference signal.

3. An apparatus as claimed in claim 2 wherein said cut lumber pieces are of predetermined lengths, said platform means comprises at least two spaced apart weighing platforms each secured to a displaceable support linkage for maintaining each said platform elevated from the support plane of said conveyor means, means to elevate said individual lumber pieces to said weighing platforms; and transducer means connected to said displaceable linkage to convert the displacement of said linkage when a lumber piece is positioned on said weighing platform to an electrical signal proportional to the weight of said lumber piece.

4. An apparatus as claimed in claim 3 wherein said means to elevate said lumber pieces is a ramp element aligned with said weighing platforms and extending from said support plane to a leading edge of each said weighing platforms.

5. An apparatus as claimed in claim 3 wherein said displaceable linkage comprises a link arm secured at a top end under an associated one of said platforms and supporting said platform, a bottom end of said link arm being connected to a strain cell having said transducer means for converting the load on said platform to a representative electrical signal.

6. An apparatus as claimed in claim 3 wherein said sensing means comprises a proximity detector device for detecting a lumber piece immediately prior to positioning same on said platforms, a plurality of photodetectors for sensing the cross-sectional length and thickness of said lumber piece, and at least two presence detector devices for determining said predetermined length of said lumber piece.

7. An apparatus as claimed in claim 6 wherein said presence detectors are limit switches.

8. An apparatus as claimed in claim 6 wherein there is further detecting means downstream of said platforms to detect said piece of lumber analyzed and means for classifying said piece of lumber.

9. An apparatus as claimed in claim 8 wherein said means for classifying comprises applicator means for applying a marking at one of the end of said lumber piece.

10. An apparatus as claimed in claim 3 wherein said conveyor means comprises spaced apart driven conveyor chains having engaging means on a top side thereof for pushing individual lumber pieces widthwise along a conveyor path, said weighing platforms being disposed between said conveyor chains at a predetermined location along said conveyor path.

11. A method of automatically detecting the approximate percentage humidity in predetermined types of cut lumber, said method comprising the steps of:

(i) conveying individual pieces of said cut lumber along a conveyor path and over weighing means associated with said conveyor path;

(ii) detecting the weight of said individual pieces and generating information signals representative of their weight;

(iii) detecting the length of said individual pieces and generating information signals representative thereof;

(iv) detecting the cross-sectional dimension of said individual pieces and generating information signals representative thereof; and (v) analyzing said information signals and producing a resulting signal for comparison with one or more reference signals set by control mans and determined by a scale which approximates the percentage humidity in specific lumber types by weight per cubic feet to identify and classify individual lumber pieces in accordance with said reference signals.

12. A method as claimed in claim 11 wherein said step (i) comprises conveying said individual pieces which have predetermined lengths over an elevating ramp immediately before conveying said individual pieces over said weighing means, said weighing means having at least two weighing platforms positioned transversely and elevated from the support plane of said conveyor means.

13. A method as claimed in claim 12 wherein said step (ii) comprises translating the load on said weighing platforms from a mechanical displacement to an electrical signal, said electrical signal being one of said information signals.

14. A method as claimed in claim 11 wherein said reference signal is determined by (a) identifying the type of lumber pieces to be weighed; (b) selecting on a scale chart the percentage humidity classifying rating as a function of weight per cubic feet; and (c) determining from said chart a corresponding control element setting to establish said one or more reference signals.

15. A method as claimed in claim 14 wherein prior to step (ii) there is provided the step of detecting the proximity of a lumber piece immediately prior to positioning same on said weighing means.

* * * * *